US006921081B2

(12) United States Patent
Wobben

(10) Patent No.: US 6,921,081 B2
(45) Date of Patent: Jul. 26, 2005

(54) ANNULAR SEAL

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 10/466,645

(22) PCT Filed: Jan. 11, 2002

(86) PCT No.: PCT/EP02/00206

§ 371 (c)(1),
(2), (4) Date: Oct. 2, 2003

(87) PCT Pub. No.: WO02/057668

PCT Pub. Date: Jul. 25, 2002

(65) Prior Publication Data

US 2004/0046330 A1 Mar. 11, 2004

(30) Foreign Application Priority Data

Jan. 19, 2001 (DE) .......................................... 101 02 161

(51) Int. Cl.[7] ................................................ F16J 15/18
(52) U.S. Cl. .......................... 277/549; 277/553; 277/510
(58) Field of Search ................................. 277/549, 553, 277/510

(56) References Cited

U.S. PATENT DOCUMENTS

| 3,218,087 A | * | 11/1965 | Hallesy | 277/532 |
| 3,394,941 A | | 7/1968 | Traub | 277/144 |
| 3,630,532 A | | 12/1971 | Traub | 277/144 |
| 4,039,198 A | | 8/1977 | Stanton | 277/118 |
| 4,201,392 A | | 5/1980 | Watts | 277/165 |
| 4,848,777 A | | 7/1989 | Zollo et al. | 277/188 |
| 4,953,876 A | * | 9/1990 | Muller | 277/556 |
| 6,036,191 A | * | 3/2000 | Millard | 277/553 |

FOREIGN PATENT DOCUMENTS

| DE | 1 588 508 | 3/1971 |
| DE | 38 28 692 C2 | 11/1971 |
| DE | 25 03 807 | 7/1975 |
| DE | 33 26 053 A1 | 2/1985 |
| DE | 37 39 179 C1 | 5/1989 |
| DE | 691 12 617 T2 | 4/1996 |
| EP | 0 505 352 A1 | 9/1992 |
| GB | 2 070 157 A | 9/1981 |

* cited by examiner

Primary Examiner—Enoch Peavey
(74) Attorney, Agent, or Firm—Seed IP Law Group PLLC

(57) ABSTRACT

According to the invention a seal—arranged between a radially inwardly facing outer boundary surface of an annular sealing gap and a radially outwardly facing inner boundary surface of the sealing gap—is characterized by a sealing ring having a sealing surface which bears sealingly against one of the boundary surfaces of the sealing gap and having a pressure surface which on the side of the sealing ring in radially opposite relationship to the sealing surface forms with the other of the boundary surfaces of the sealing gap an intermediate space which is wedge-shaped in cross-section, and a pressure ring which is biased by a biasing means at least at times into the intermediate space against the other of the boundary surfaces of the sealing gap and the pressure surface for pressing the sealing surface against the one boundary surface of the sealing gap.

11 Claims, 3 Drawing Sheets

ANNULAR SEAL

FIELD OF THE INVENTION

The present invention concerns a seal arranged between a radially inwardly facing outer boundary surface of an annular sealing gap and a radially outwardly facing inner boundary surface of the sealing gap.

BACKGROUND OF THE INVENTION

Seals for sealing off annular gaps are required in technology in particular in mechanical engineering in the most widely varying geometrical and utilitarian shapes. Consequently the most widely varying structural configurations of such seals are known in the state of the art—including in the form of prepared standard components, even to a standardized configuration. One of the simplest forms of known annular seals is the O-ring made of rubber. Something that is of a substantially more complicated structure is for example what is known as the shaft sealing ring, a sealing element comprising a metal ring as the outer seat and a radially inwardly facing sealing lip made of rubber. Shaft sealing rings of that kind serve for example for sealing a transmission housing from which a rotating shaft is extended. For that purpose the metal ring is fitted in the bore in the housing through which the shaft is passed, and the sealing lip bears against a circular-cylindrical peripheral surface, which is as smooth-walled as possible, of the shaft. The contact surface area between the sealing lip and the surface of the shaft is reduced to an annular line around the shaft, more specifically by virtue of the fact that the sealing lip tapers radially inwardly to a geometrically sharp edge. That design configuration permits high speeds of rotation for the shaft, in which case for example transmission oil which is in the interior of the housing and which is to be prevented from escaping from the housing by the seal forms a film of lubricant under the sealing lip. As is known dynamic pressure conditions in the region of the contact surface then provide that the oil does not penetrate outwardly through beneath the sealing lip. In addition, in particular felt rings are known for sealing off annular gaps around a component which not only rotates but which is also moved through the bore with a translatory motion.

At any event seals are exposed to wear and possible destruction for example due to fouling or pressure—in the form of seals sealing against a moving component but in particular also by virtue of abrasive wear and fatigue—, and that can generally also result in erosion of the sealing element in the region of the contact surface and thus can result on the one hand in a reduction in a biasing force with which the seal bears against a complementary component, and on the other hand can even result in the seal opening up and gaping open. Therefore wear of the seal restricts the operating life thereof and makes it necessary to replace the seal when the apparatus of which the seal is a component part has a longer service life.

DE-OS No 2 144 681 discloses a composite seal for piston rods and the like. The seal has a first annular member and a second annular member which are arranged in a condition of butting against each other in the axial direction and fixedly around the outside of a reciprocatable member, wherein the first and second annular members have portions which are in sealing engagement with the reciprocatable member. The second annular member, the high-pressure member, is loaded by the first annular member in order to increase the bearing pressure of the high-pressure member or the lip thereof against the reciprocatable member.

U.S. Pat. No. 4,201,392 discloses a seal which is made up of three parts.

SUMMARY OF THE INVENTION

In comparison therewith one object of the invention is to provide a seal whose service life is increased.

According to the invention that object is attained by a seal having the features of claim 1. Preferred configurations of the invention are recited in the appendant claims.

According to the invention a seal for sealing an annular sealing gap comprises a sealing ring, a biasing means and a pressure ring. The sealing ring has a sealing surface which bears sealingly against a boundary surface of the sealing gap. In accordance with the invention this can be the radially inwardly facing outer boundary surface of the sealing gap or the radially outwardly facing inner boundary surface of the sealing gap. With the other boundary surface of the sealing gap (that is to say the inner or the outer boundary surface) a pressure surface of the sealing ring, on its side which is radially opposite to the sealing surface, forms an intermediate space which is wedge-shaped in cross-section. The pressure ring is biased thereinto by the biasing means, more specifically against the surfaces forming the wedge-shaped intermediate space, into the intermediate space which tapers in a wedge-shaped configuration, so that the pressure ring urges the intermediate space apart and thus presses the sealing ring with its sealing surface sealingly against the (outer or inner) boundary surface of the sealing gap.

In this case the pressure ring can for example simply be of a circular or rectangular cross-section or cross-sectional component and can be for example simply pressed into the wedge-shaped intermediate space by a spring ring as the biasing means, but a preferred pressure ring is in the form of a pressure ring of a substantially triangular cross-section—in particular formed from an outer operative surface in the form of a radially outwardly directed circular-cylindrical peripheral surface and with an inner operative surface in the form of a radially inwardly directed circular-conical peripheral surface and with a biasing surface in the form of an axially directed annular surface against which the biasing means is biased. The biasing means is preferably a fluid which is under pressure on one side of the seal and which bears against the biasing means through a line communication—for example simply in the form of gap-shaped intermediate spaces which are not further sealed off as far as the sealing arrangement according to the invention and the structural space thereof. So that the biasing surface which is in the form of the axially directed annular surface then securely receives the pressure of the fluid and can transmit it on to the operative surfaces of the pressure ring, the biasing surface is preferably of a concave configuration. Then, even in the case of a complementarily directed, axial, flat annular surface of a seat in which the seal according to the invention is mounted, it can delimit therewith an annular pressure chamber (that is to say of a cross-section which on the one hand is delimited arcuately in a manner corresponding to the concave surface and on the other hand delimited straight in a manner corresponding to the flat surface).

Preferably and in the above-mentioned example corresponding to the radially inwardly directed circular-conical peripheral surface as the inner operative surface of the pressure ring, the sealing ring has as the pressure surface against which the inner operative surface of the pressure ring bears, a circular-conical peripheral surface which is complementary thereto and which is therefore directed radially outwardly—wherein the sealing surface is then accordingly of a radially inwardly facing nature on the radially opposite side of the sealing ring.

Preferably the sealing surface according to the invention has two radially projecting sealing lips which for example extend bead-like over the periphery of the sealing surface, depending on the respective orientation thereof therefore either radially inwardly or radially outwardly. The two sealing lips preferably define between them a groove in the sealing ring so that the cross-section through the sealing lips and the groove is preferably delimited by a steady corrugated or wavy line, wherein the cross-section through the sealing lips and the groove can in each case be of an arcuate shape (the lips convex and the groove concave).

The seal according to the invention can be particularly advantageously used for sealing an annular gap between an outer component with a bore and an inner component which moves oscillatingly through the bore. Particularly for that situation of use the sealing surface of the sealing ring faces radially inwardly and bears against the preferably circular-cylindrical peripheral surface of the inner component which is advantageously of a configuration which is as smooth-surfaced as possible. That situation of use occurs for example in relation to a piston whose piston rod is passed outwardly as the inner component through the piston housing as the outer component. Here the annular gap therebetween usually has to be sealed in relation to a fluid which is disposed as the pressure medium in the piston. In accordance with the invention that fluid which in the oscillating movement of the piston is under pressure from time to time—more specifically in pulse-like manner—in each piston stroke movement, can now penetrate as a biasing means through intermediate spaces of the gap to the mounting seat of the pressure ring and there (preferably by way of the biasing surface) can urge the pressure ring into the wedge-shaped intermediate space between the sealing ring and the other of the surfaces of the sealing gap—which in this situation of use is the radially inwardly facing outer surface of the sealing gap in the outer component.

If now for example due to the oscillating piston stroke movement or by virtue of other wearing influences on the sealing surface of the sealing ring, abrasive wear takes place, the seal according to the invention advantageously provides that such abrasive wear is compensated by virtue of the biasing effect in respect of the pressure ring, by virtue of the fact that the sealing ring enjoys so-to-speak 'take-up adjustment' by virtue of the pressure force of the pressure ring, that is to say it is pressed against the complementary sealing gap surface by the biasing effect, applied by the pressure ring, of the biasing means (in the last-described example, the fluid).

In regard to the configuration of the two sealing lips with the groove disposed therebetween, it is further advantageous in the situation of use involving the oscillating component that, with each piston stroke, a portion of the fluid which wets the inner component is transported into the groove between the sealing lips and there forms a kind of reservoir for lubrication of the sealing surface. That has an advantageous effect in particular if the fluid itself has certain lubricant properties. It also has that advantageous lubricating effect however for example when, in contact with the material of the sealing surface, for example, it promotes the anti-friction properties of that material with the surface material of the inner component (or more broadly with the complementary component against which it bears) or also the resistance to wear thereof, for example by virtue of chemical reaction or the formation of a protective film.

As therefore in this embodiment with each translatory movement of the inner component out of the fluid, the fluid is transported as a lubricant to the sealing surface, this advantageous effect can be additionally promoted in accordance with the invention by virtue of the fact that additionally disposed on the other side of the seal in the wall of the bore in the outer component there is a fluid storage groove which is provided there for example in the form of an annular groove over the entire periphery. Fluid which possibly moves still further through beneath the seal on the wetted surface of the inner component, before the seal completely seals off under the biasing effect of the fluid, can collect in the fluid storage groove, and that initially additionally promotes the sealing effect insofar as that portion of the fluid is not further transported outwardly. In addition the return stroke movement of the inner component transports fluid out of that fluid storage groove back to the sealing surface where the fluid can bring about the same promotional (for example lubricating) effects which have already been described hereinbefore in relation to the stroke movement.

It can happen that the abrasion wear at the seal is in operation unexpectedly high. That can be attributed essentially to the severe deformation of the seal in operation. In order to counteract this, a further configuration provides that the seal has a core which is stable in respect of shape. That core which is stable in respect of shape can be produced for example from polyethylene (PE), polypropylene (PP) or polyoxymethylene (POM). In particular POM is a material which is wide-spread in the sanitary sector because it is easy to work with and has hydrophobic properties.

In that respect the sealing ring can remain unchanged in its external shape. The stable core of the sealing ring can substantially correspond to the shape of the sealing ring, that is to say it can be of a wedge-shaped configuration, and enclosed by the sealing material in such a way that the external shape of the seal remains unchanged. Alternatively the stable core can also substantially be in the shape of the sealing ring and can again be coated therearound with the sealing material. The thickness of the sealing material is then preferably approximately in the range of between 2 and 3 mm.

The seal according to the invention can be particularly advantageously used according to the invention in the described manner in transport pistons in sea water desalination plants in which transport pistons convey sea water at comparatively low piston stroke frequencies of approximately 0.1 Hz. However the seal according to the invention can also be used to advantage in relation to other pistons or pumps.

BRIEF DESCRIPTION OF THE SEVERAL VIEWS OF THE DRAWINGS

The present invention is described hereinafter with reference to the accompanying drawings in which.

DETAILED DESCRIPTION OF THE INVENTION

Figure 1:
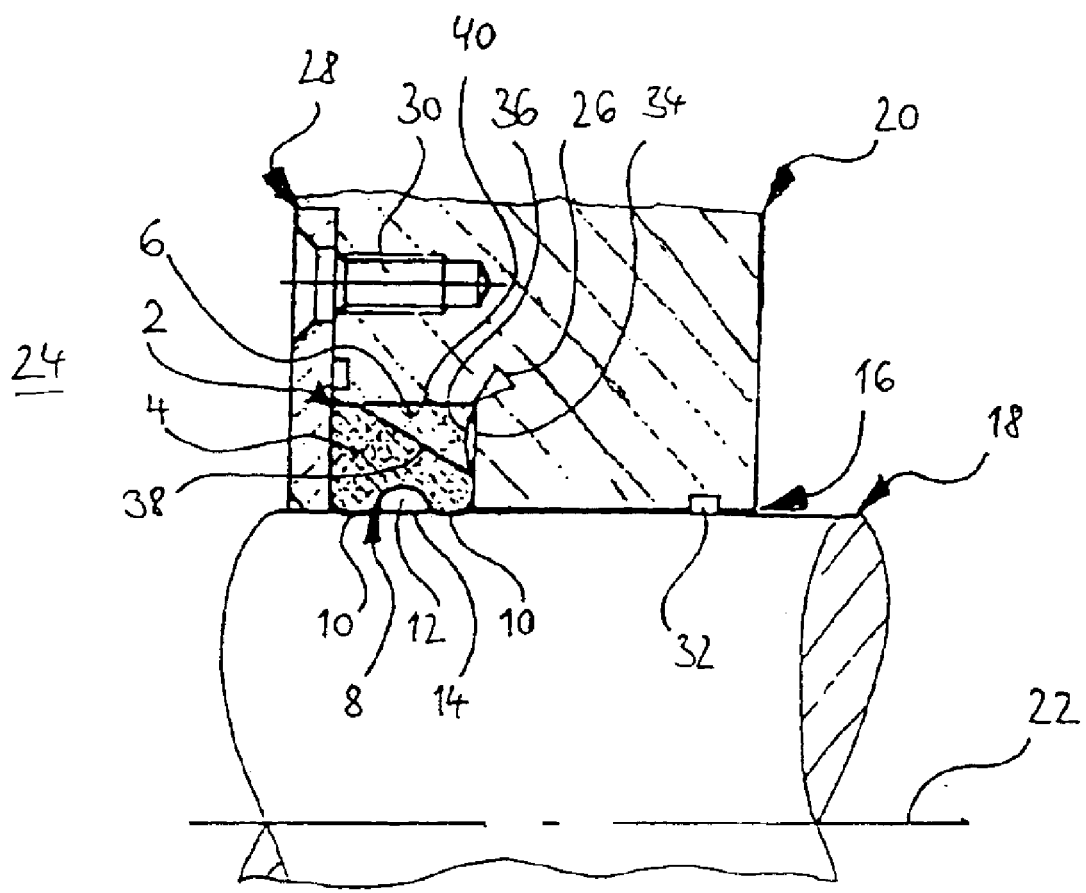
FIGS. 1 and 2 are respective sectional side views of seals according to the invention at annular sealing gaps between an outer and an inner component respectively.

Referring to FIG. 1 shown therein is a seal 2 which has a sealing ring 4 and a pressure ring 6. The sealing ring 4 has a radially inwardly facing sealing surface 8 of a cross-section in the configuration of a steady corrugated or wavy line. The corrugated line as a cross-section is furnished by two radially inwardly projecting sealing lips 10 which between them delimit a groove 12 in the sealing surface 8 of the sealing ring 4. The sealing surface 8 of the sealing ring 4 bears against a radially outwardly facing inner boundary surface 14 of a sealing gap 16 which is formed between an inner component 18 and an outer component 20. The inner component 18 is a piston rod which moves oscillatingly in the direction of the axis 22 in a bore 16 in a piston housing as the outer component 20. On the left-hand side 24 in the Figure, disposed in the piston housing is salt water 24 which is put under pressure and thereby transported by an installation (not shown) of which the piston housing 20 and the piston rod 18 are components. The seal 2 which sits in a seat 26 in the form of an annular groove in the outer component 20 is held axially in the seat 26 by a metal ring 28 by means of a screw 30.

With each stroke movement of the piston rod 18 water which wets the surface of the piston rod 18 is transported into the region of the sealing lips 10 and the groove 12 between the sealing lips 10, there forms a lubricant film and collects in the groove 12.

Abrasive wear takes place at the sealing lips 10 due to the oscillating movement of the piston rod 18 so that after a certain period of operation the sealing action of the seal 2 decreases and progressively somewhat more water 24 is transported outwardly with each stroke movement of the piston rod 18. Water 24 which wets the surface of the piston rod 18 and which is transported outwardly entirely under the sealing surface 8 (towards the right in FIG. 1) there collects in a fluid storage groove 32 which is provided in an annular configuration in the radially inwardly facing wall of the bore 16 in the outer component 20. In this arrangement the wall bears with a clearance fit against the circular-cylindrical peripheral surface which, being of a smooth-walled nature, forms the surface of the piston rod 18. Thus the water 24 which is transported outwardly beneath the seal 22 as wetting the piston rod 18 can collect there and is transported from there back into the region of the seal 2 in the return travel of the piston rod 18 and thereby additionally promotes the formation of a lubricant film in the region between the seal 2 and the boundary surfaces of the sealing gap (16).

As the abrasive wear of the sealing lips 10 becomes greater and greater, in particular by virtue of the oscillating movement of the piston rod 18, more and more water 24 penetrates outwardly and in so doing also penetrates behind the seal 2 (at the right in FIG. 1) into the seat 26. The pressure with which the water 24 penetrates outwardly then builds up between the boundary surface 34 of the seat 26, which is directed axially (towards the left), and a concave biasing surface 36 of the pressure ring 6, which is directed axially (towards the right), and thus biases the pressure ring 6 axially (towards the left) into an intermediate space which is formed with a wedge-shaped cross-section between a radially outwardly directed pressure surface 38 of the sealing ring 4 and a radially inwardly facing outer boundary surface 40 of the sealing gap 16. In this case, the radially inwardly facing outer boundary surface 40 of the sealing gap 16 is the radially directed boundary surface of the seat 26 and it is in the form of a circular-cylindrical surface; and the radially outwardly directed pressure surface of the sealing ring 4 is in the form of a circular-conical surface, for forming the wedge-shaped cross-section of the intermediate space.

By virtue of this arrangement and configuration, the outwardly displaced water 24 now presses as a biasing means against the biasing surface 36 of the pressure ring 6 into the wedge-shaped intermediate space between the radially outwardly facing pressure surface 38 of the sealing ring and the radially inwardly facing outer boundary surface of the seat 26 and thus causes the sealing ring 4 to be pressed with its sealing surface 8 against the cylindrical external surface of the piston 18 (so that it therefore experiences 'take-up adjustment'). Thus the seal 16 according to the invention automatically involves take-up adjustment in accordance with the invention after abrasive wear or also after wear of another kind.

Figure 2:
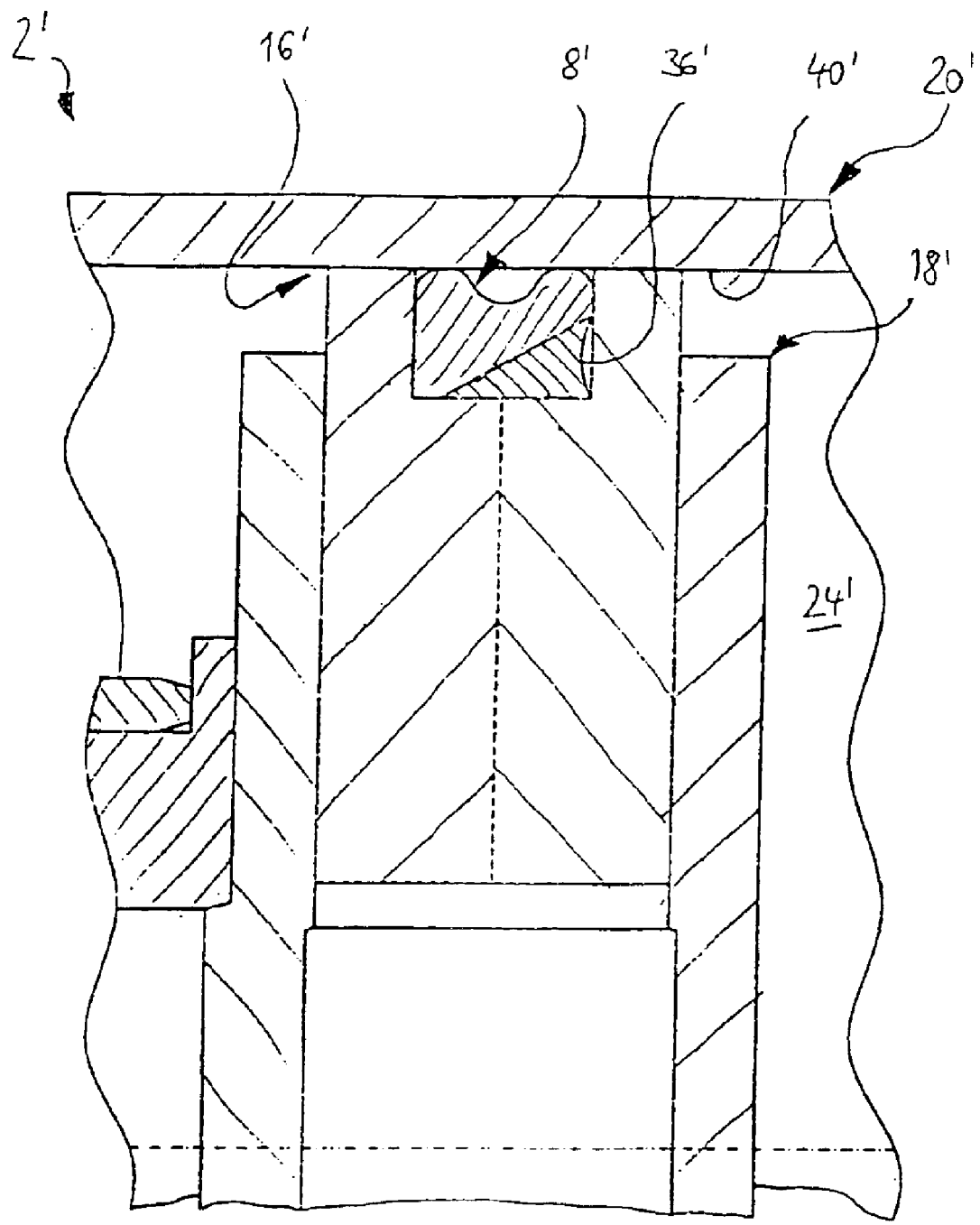

The seal 2' shown in FIG. 2 differs from the seal 2 shown in FIG. 1 in principle in particular in that it is fitted in an inner component 18' (here a piston 18'). Accordingly its sealing surface 8' faces radially outwardly and there bears against a radially inwardly facing outer surface 40' of a sealing gap 16'. The surface 40' against which the sealing surface 8' of the seal 2' bears is the radially inwardly facing circular-cylindrical peripheral surface of a cylinder 20' in which the piston 18' reciprocates.

A further essential difference in principle in the seal 2' as shown in FIG. 2, compared to the seal 2 shown in FIG. 1, is that the concave biasing surface 36' faces in the direction of the pressure side of the piston (towards the right in FIG. 2) where a fluid 24' is under pressure. Therefore the biasing action of the fluid 24' does not begin only when (as in the case of the seal illustrated in FIG. 1) the fluid 24 has begun to pass through beneath the sealing surface 8, but the pressure of the fluid 24' acts on the biasing surface at any time.

Figure 3:
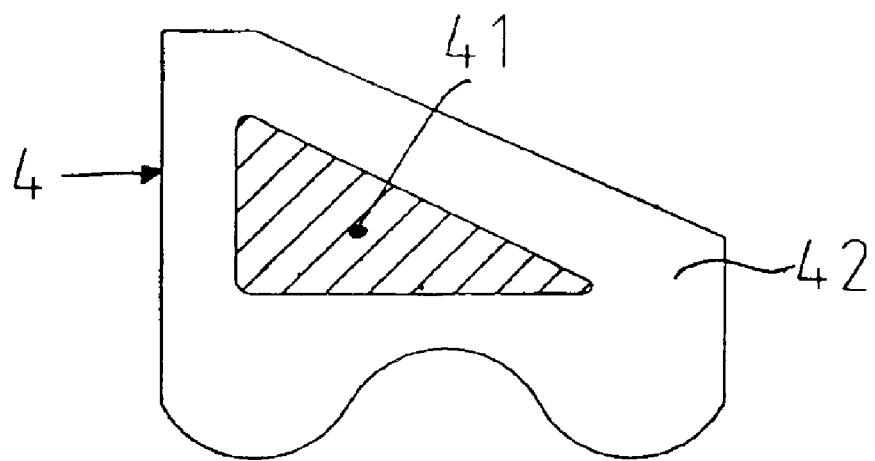
FIGS. 3 and 4 show two configurations of a seal according to the invention with a core which is stable in respect of shape.
Figure 4:
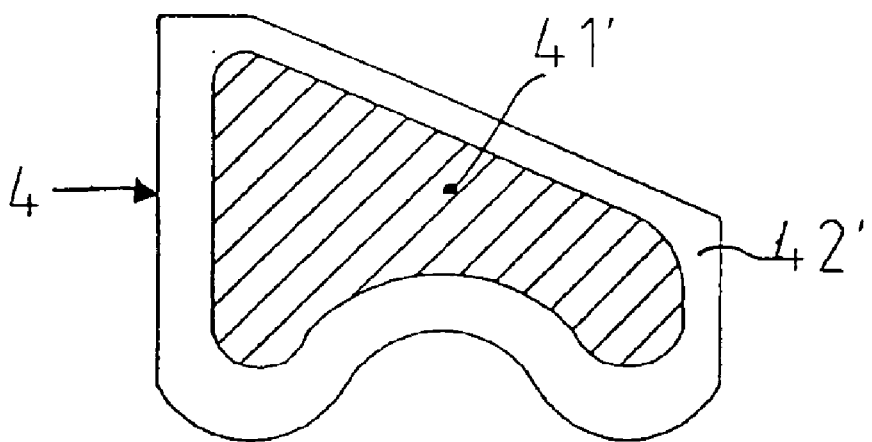

The described seal can also have a core which is stable in respect of shape and which is preferably made from a plastic material. A first configuration of such a seal with a core which is stable in respect of shape is shown in FIG. 3. In this arrangement the core 41 which is stable in shape is of the wedge-shaped form of a pressure ring and is arranged within the sealing ring 42. In a further configuration which is shown in FIG. 4 the core 41' which is stable in respect of shape can also be in the form of the sealing ring 4 and can be coated with a sealing material 42', the coating 42' preferably being between 2 and 3 mm thick. These configurations combat the problem of excessive abrasive wear of the seal in operation. That is due to the fact that the seal is overall relatively easily deformable and as a result is entrained in the translatory movement of the piston rod 18 and passes between the piston rod 18 and the piston housing 20, so that the seal can then be simply ground away. That is avoided in the case of a seal which is stable in respect of shape.

What is claimed is:

1. A seal for arrangement between a radially inwardly facing outer boundary surface of an annular sealing gap and a radially outwardly facing inner boundary surface of the sealing gap comprising:

a sealing ring having a sealing surface which bears sealingly against one of the boundary surfaces of the sealing gap and having a pressure surface which on the side of the sealing ring in radially opposite relationship to the sealing surface forms with the other of the boundary surfaces of the sealing gap an intermediate space which is wedge-shaped in cross-section, and a pressure ring which is biased by a biasing means at least at times into the intermediate space against the other of the boundary surfaces of the sealing gap and the pressure surface for pressing the sealing surface against the one boundary surface of the sealing gap, wherein the pressure ring has an outer operative surface in the form of a radially outwardly directed circular-cylindrical peripheral surface which is biased against the other of the boundary surfaces of the sealing gap, and an inner operative surface in the form of a radially inwardly directed circular-conical peripheral surface which is biased against the pressure surface of the sealing ring, which is in the form of a complementary circular-conical peripheral surface, and also a concave biasing surface in the form of an axially directed annular surface against which the biasing means is biased, characterized in that the sealing surface of the sealing ring has two radially projecting sealing lips which enclose between them a groove in the sealing ring.

2. The seal according to claim 1 characterized in that the biasing means is a fluid which is under pressure on one side of the seal and bears against the pressure ring.

3. A seal for arrangement between a radially inwardly facing outer boundary surface of an annular sealing gap and a radially outwardly facing inner boundary surface of the sealing gap comprising:

a sealing ring having a sealing surface which bears sealingly against one of the boundary surfaces of the sealing gap and having a pressure surface which on the side of the sealing ring in radially opposite relationship to the sealing surface forms with the other of the boundary surfaces of the sealing gap an intermediate space which is wedge-shaped in cross-section, the sealing surface of the sealing ring having two radially projecting sealing lips which enclose between them a groove in the sealing ring, and the cross-section through the sealing lips and the groove is respectively in the form of a circular arc;

a pressure ring which is biased by a biasing means at least at times into the intermediate space against the other of the boundary surfaces of the sealing gap and the pressure surface for pressing the sealing surface against the one boundary surface of the sealing gap, the pressure ring having an outer operative surface in the form of a radially outwardly directed circular-cylindrical peripheral surface which is biased against the other of the boundary surfaces of the sealing gap and an inner operative surface in the form of a radially inwardly directed circular-conical peripheral surface which is biased against the pressure surface of the sealing ring, which is in the form of a complementary circular-conical peripheral surface and a biasing surface in the form of an axially directed annular surface against which the biasing means is biased.

4. The seal according to claim 3 characterized in that the cross-section through the sealing lips and the groove is a steady wavy line.

5. The seal according to claim 1 characterized in that the one of the boundary surfaces of the sealing gap is the peripheral surface of a circular-cylindrical inner component and the other of the boundary surfaces of the sealing gap is the radially inwardly facing surface of a circular-cylindrical bore in an outer component.

6. The seal according to claim 5 characterized in that the inner component moves oscillatingly through the bore.

7. The seal according to claim 6 characterized in that a fluid is under pressure on one side of the seal and on the other side of the seal provided in a wall of the bore which bears with a clearance fit against the peripheral surface of the inner component is an annular fluid storage groove.

8. A seal for arrangement between a radially inwardly facing outer boundary surface of an annular sealing gap and a radially outwardly facing inner boundary surface of the sealing gap comprising:

a sealing ring having a sealing surface which bears sealingly against one of the boundary surfaces of the sealing gap and having a pressure surface which on the side of the sealing ring in radially opposite relationship to the sealing surface forms with the other of the boundary surfaces of the sealing gap an intermediate space which is wedge-shaped in cross-section, the sealing ring having a plastic core which is stable in respect to shape, the sealing surface of the sealing ring having two radially projecting sealing lips which enclose between them a groove in the sealing ring, and a pressure ring which is biased by a biasing means at least at times into the intermediate space against the other of the boundary surfaces of the sealing gap and the pressure surface for pressing the sealing surface against the one boundary surface of the sealing gap, the pressure ring having an outer operative surface in the form of a radially outwardly directed circular-cylindrical peripheral surface which is biased against the other of the boundary surfaces of the sealing gap, and an inner operative surface in the form of a radially inwardly directed circular-conical peripheral surface which is biased against the pressure surface of the sealing ring, which is in the form of a complementary circular-conical peripheral surface, and also a biasing surface in the form of an axially directed annular surface against which the biasing means is biased.

9. The seal according to claim 8 characterized in that the core which is stable in respect of shape is substantially in the shape of the pressure ring or the sealing ring and is coated with a sealing material.

10. The piston apparatus having a cylinder displaceable in a piston for conveying a fluid and a seal according to claim 1 arranged between the inside wall of the cylinder and the outside wall of the piston.

11. The sea water desalination installation having a piston apparatus according to claim 10 for conveying sea water and/or concentrated salt water.

* * * * *